US011663094B2

United States Patent
K et al.

(10) Patent No.: US 11,663,094 B2
(45) Date of Patent: May 30, 2023

(54) REDUCING RECOVERY TIME OF AN APPLICATION

(71) Applicant: HEWLETT PACKARD ENTERPRISE DEVELOPMENT LP, Houston, TX (US)

(72) Inventors: Kanakeshan K, Bangalore (IN); Bhakthavatsala K Naidu, Bangalore (IN); Manish Ramesh Kulkarni, Bangalore (IN); Saurabh Kadiyali, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 475 days.

(21) Appl. No.: 15/828,028

(22) Filed: Nov. 30, 2017

(65) Prior Publication Data

US 2019/0163584 A1 May 30, 2019

(51) Int. Cl.
*G06F 11/16* (2006.01)
*G06F 11/20* (2006.01)
(Continued)

(52) U.S. Cl.
CPC ........ *G06F 11/1658* (2013.01); *G06F 9/4856* (2013.01); *G06F 11/1471* (2013.01); *G06F 11/2002* (2013.01); *G06F 11/2023* (2013.01)

(58) Field of Classification Search
CPC .. G06F 11/16; G06F 11/1658; G06F 11/1471; G06F 11/2002; G06F 11/2023
(Continued)

(56) References Cited

U.S. PATENT DOCUMENTS

| 6,247,139 B1 * | 6/2001 | Walker | G06F 16/10 714/2 |
| 6,249,879 B1 * | 6/2001 | Walker | G06F 11/1435 714/11 |

(Continued)

FOREIGN PATENT DOCUMENTS

| CN | 101055538 A | 10/2007 |
| CN | 102656565 A | 9/2012 |

(Continued)

OTHER PUBLICATIONS

Reduce Recovery Time & Point Objectives (RPO & RTO). (Web Page), Retrieved Jun. 20, 2017, 6 Pgs., http://www.zerto.com/solutions/use-cases/reduce-rto-rpo-recovery-objectives/.

(Continued)

*Primary Examiner* — Kamini B Patel
(74) *Attorney, Agent, or Firm* — Trop, Pruner & Hu, P.C.

(57) ABSTRACT

Examples provided herein describe a method for reducing recovery time for an application. For example, a first physical processor of a computing device may monitor, based on a first application instance of the application running in a first mode, for failure detection of the first application instance running on a first computing device. The first physical processor may determine that the first application instance is to be changed from the first mode to a second mode. Based on the determination, the first physical processor may validate that a second application instance can run in the first mode by performing a data integrity compliance check. Responsive to validating that the second application instance can run in the first mode, the first physical processor may facilitate running of the second application instance in the first mode.

20 Claims, 4 Drawing Sheets

(51) Int. Cl.
*G06F 9/48* (2006.01)
*G06F 11/14* (2006.01)

(58) Field of Classification Search
USPC .......................................................... 714/13
See application file for complete search history.

(56) References Cited

U.S. PATENT DOCUMENTS

| | | |
|---|---|---|
| 7,657,657 B2 | 2/2010 | Rao et al. |
| 9,274,903 B1 | 3/2016 | Garlapati et al. |
| 9,430,337 B1* | 8/2016 | Gupta ................... G06F 11/008 |
| 9,639,439 B2 | 5/2017 | Laicher et al. |
| 2007/0079061 A1* | 4/2007 | Ogasawara ............... G06F 9/52 |
| | | 711/112 |
| 2007/0244937 A1 | 10/2007 | Flynn et al. |
| 2009/0307166 A1* | 12/2009 | Routray ................... G06N 5/04 |
| | | 706/46 |
| 2012/0030508 A1* | 2/2012 | Vivian ..................... G06F 11/20 |
| | | 714/6.3 |
| 2012/0265937 A1* | 10/2012 | Resch ...................... G06F 3/067 |
| | | 711/118 |
| 2012/0311381 A1* | 12/2012 | Porterfield .......... G06F 11/1004 |
| | | 714/6.22 |
| 2015/0212909 A1* | 7/2015 | Sporel ................. G06F 11/2023 |
| | | 714/4.11 |
| 2015/0317194 A1* | 11/2015 | Sampath ............. G06F 11/2023 |
| | | 714/703 |
| 2016/0019107 A1 | 1/2016 | North |
| 2016/0048408 A1 | 2/2016 | Madhu et al. |
| 2016/0092322 A1* | 3/2016 | Nosov ................. G06F 11/2007 |
| | | 714/4.11 |
| 2016/0210205 A1 | 7/2016 | McAlister et al. |
| 2017/0031613 A1 | 2/2017 | Lee et al. |
| 2017/0116065 A1 | 4/2017 | Holden et al. |
| 2017/0242599 A1* | 8/2017 | Patnaik ................... G06F 3/067 |
| 2017/0353544 A1* | 12/2017 | Lala ........................ H04L 45/28 |
| 2018/0349239 A1* | 12/2018 | Gohil ..................... G06F 16/27 |

FOREIGN PATENT DOCUMENTS

| | | |
|---|---|---|
| WO | 2006/075332 A2 | 7/2006 |
| WO | WO-2015138586 A1 | 9/2015 |

OTHER PUBLICATIONS

Zerto.com, Reduce Recovery Point Objectives & Recovery Time Objectives (RPO & RTO), retrieved online Jun. 20, 2017, 6 pages, http://www.zerto.com/solutions/use-cases/reduce-rto-rpo-recovery-objectives/.

Extended European Search Report received for EP Patent Application No. 18836592.8, dated Jun. 19, 2020, 10 pages.

* cited by examiner

FIG. 1  SYSTEM 10

REDUCING RECOVERY TIME OF AN APPLICATION

BACKGROUND

Many systems need their business critical IT services to be highly available. These services rely on failure detection and failover of a workload or application to a standby computing device to respond to the failure to make the workload of that service continuously available. Existing solutions may take too much time to failover to a secondary computing device and may find management of failovers across physical, virtual and cloud environments to be difficult. Further, existing solutions may fail to ensure that data replication during the failover meets QoS requirements.

BRIEF DESCRIPTION OF THE DRAWINGS

The following detailed description references the drawings, wherein.

DETAILED DESCRIPTION

Figure 1:
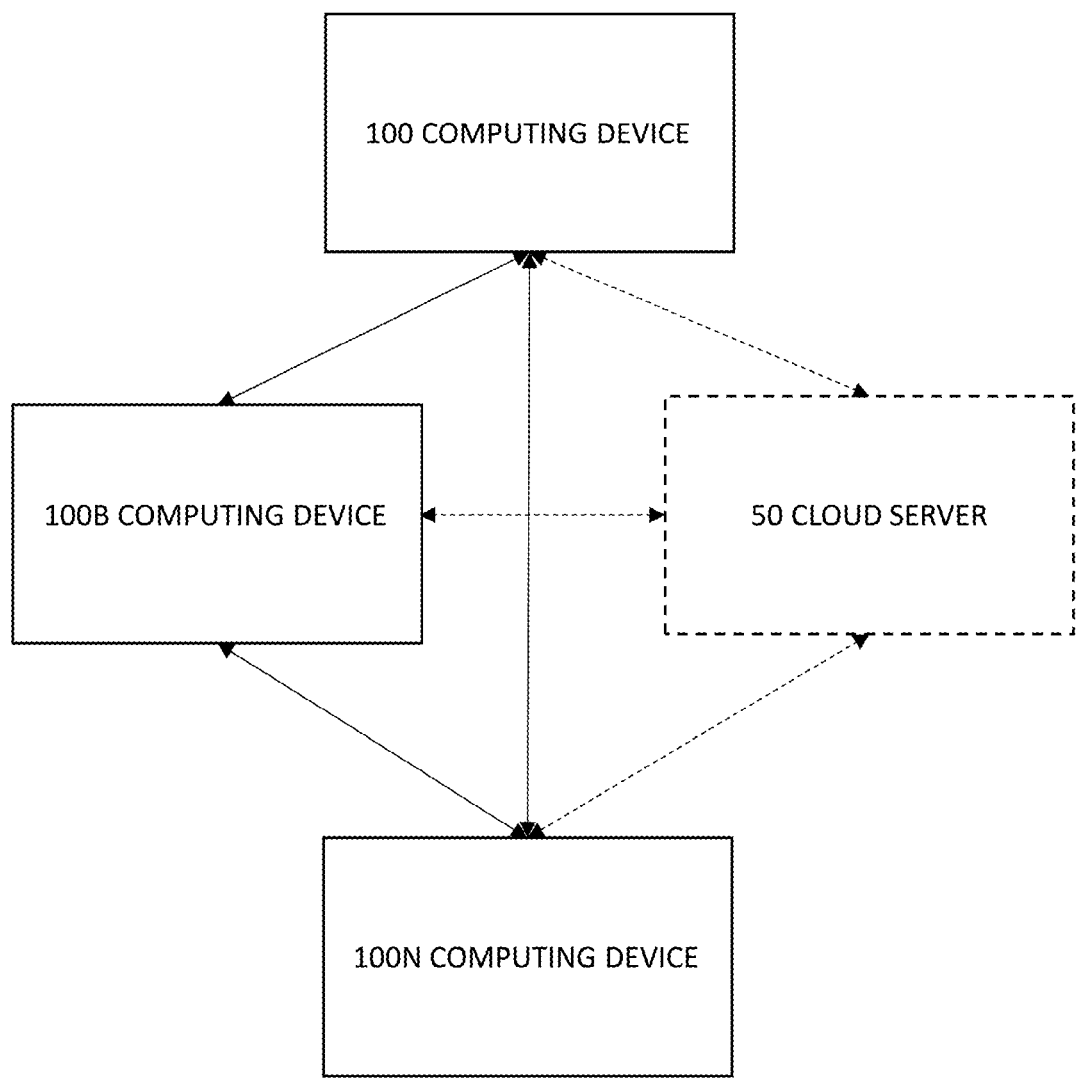
FIG. 1 is a block diagram depicting an example environment in which various examples may be implemented as a system that reduces recovery time of an application.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for reducing recovery time of an application. The disclosed examples may include systems, devices, computer-readable storage media, and methods for reducing recovery time of an application. For purposes of explanation, certain examples are described with reference to the components illustrated in FIGS. 1-5. The functionality of the illustrated components may overlap, however, and may be present in a fewer or greater number of elements and components.

Figure 4:
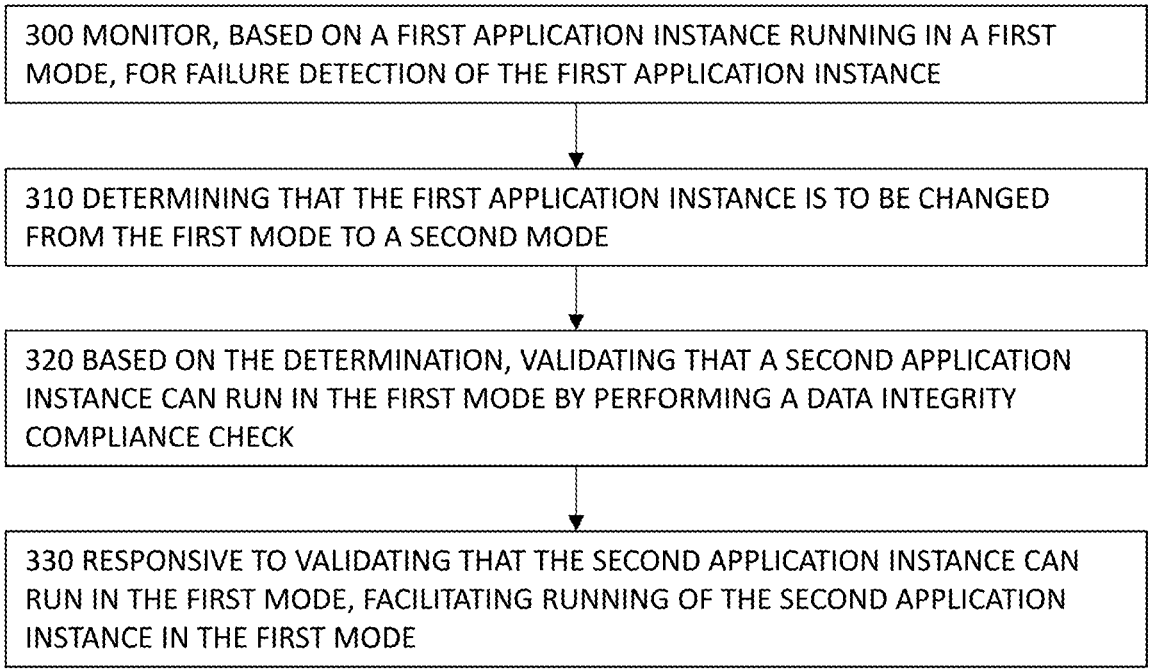
FIG. 4 is a block diagram depicting an example device for reducing recovery time of an application.
Figure 5:
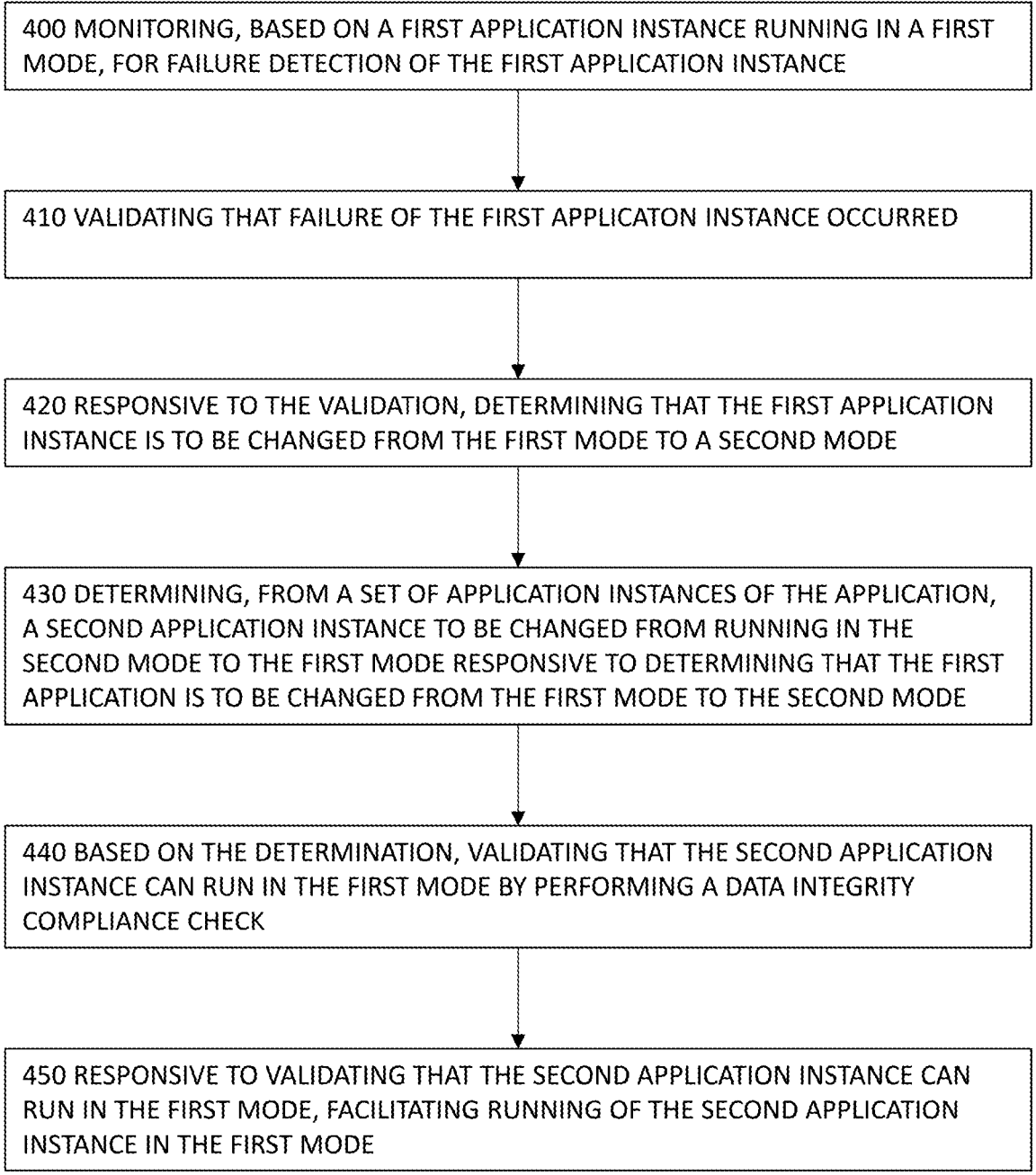
FIG. 5 is a flow diagram depicting an example method for reducing recovery time of an application.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 4-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

Many systems need their business critical IT services to be highly available. These services rely on failure detection and failover of a workload or application to a standby computing device to respond to the failure to make the workload of that service continuously available. Existing solutions may take too much time to failover to a secondary computing device and may find management of failovers across physical, virtual and cloud environments to be difficult. Further, existing solutions may fail to ensure that data replication during the failover meets quality of service requirements.

A technical solution to these technical challenges would monitor an application instance running in a first mode (e.g., a primary mode) for failure, and determine, based on the monitoring, that the application instance should be changed from running in the first mode to running in a second mode (e.g., a backup mode). A data integrity compliance check may be run on the application instance to ensure that data replication requirements are met for the application instance to be run in the second mode. A validation may also be run to determine that the application instance should be changed from running in the first mode to the second mode. Further, a second application instance may be selected from a set of application instances running on distributed computing devices, where the set of application instances may be run in the second mode. This second application instance may be changed from running in the second mode to the first mode responsive to validating the second application instance. The second application instance may be validated by running a second data integrity compliance check to ensure that the second application instance and its corresponding computing device may fulfill data replication requirements for a primary node.

Examples discussed herein address these technical challenges by reducing recovery time for an application. For example, the technical solution may monitor, based on a first application instance of the application running in a first mode, for failure detection of the first application instance running on a first computing device. The technical solution may then determine that the first application instance is to be changed from the first mode to a second mode. Based on the determination, the technical solution may validate that the second application instance can run in the first mode by performing a data integrity compliance check. Further, responsive to validating that the second application instance can run in the first mode, the technical solution may facilitate running of the second application instance in the first mode.

FIG. 1 is an example environment in which various examples may be implemented as a system that facilitates reducing recovery time of an application. In some examples, system that facilitates reducing recovery time of an application may include various components such as a set of computing devices (e.g., devices 100, 100B, . . . , 100N), a cloud server 50, and/or other devices communicably coupled to the set of computing devices. Each computing device (e.g., computing device 100) may communicate to and/or receive data from a cloud server 50, the set of other computing devices (e.g., computing devices 101B, . . . , 101N), and/or other components in a network.

A computing device may comprise a server, a laptop computing device, a desktop computing device, an all-in-one computing device, a web server, a cloud server, a mainframe, a storage card, mobile device, and/or other hardware device that comprises a physical processor that implements machine readable instructions to perform functionality. The physical processor may be at least one central processing unit (CPU), microprocessor, and/or other hardware device suitable for performing the functionality described in relation to FIG. 2.

Cloud server 50 may be any server in a cloud network communicably coupled to a computing device that facilitates provisioning, scaling, processing and/or storage of applications and application data. In some examples, server 50 may provision and manage application instances. In other examples, cloud server 50 may not be part of the environment. In these other examples, computing device 100 may facilitate provisioning, scaling, processing and/or storage of applications and application data, and each computing device (e.g., computing devices 100, 100B . . . , 100N) may manage application instances. In some examples, only two application instances (e.g., a primary and a secondary application instance) may be running in the environment. In other examples, more than two application instances (e.g., one primary and multiple secondary) may be running in the environment.

According to various implementations, a system that facilitates reducing recovery time of an application and the various components described herein may be implemented in hardware and/or a combination of hardware and programming that configures hardware. Furthermore, in FIG. 1 and other Figures described herein, different numbers of components or entities than depicted may be used.

In some examples, a system that facilitates reducing recovery time of an application may comprise a set of computing devices (e.g., computing devices 100, 100B, . . . , 100N), with a corresponding set of application instances running the set of computing devices (e.g., computing devices 100, 100B, . . . , 100N). In these examples, an application instance running on a first computing device (e.g., computing device 100) may be running in a first mode, and a set of other application instances may be running on other computing devices (e.g., computing devices 100B, . . . , 100N) in a second mode. The first mode may comprise a primary mode, and the second mode may comprise a backup mode. The application instance running in the primary mode on a computing device (e.g., computing device 100) may provide the full services of the application and have I/O capabilities to receive and send data related to the running of the application. A second application instance (e.g., a second application instance running on a second computing device 100B) running in a backup mode may be configured in a manner the same as or similar to the application instance running in the primary mode, may receive data related to the application, and may wait for an indication that it should begin a process to convert to running in the primary mode. In some examples, the application instances may be managed such that only one application instance is running in a primary mode.

In these examples, a computing device (e.g., computing device 100) that runs a first application instance of an application in primary mode may perform failover detection and failover of a workload or application to a standby, second application instance (e.g., a second application instance running on second computing device 100B) to make sure the workload for the application remains continuously available over physical, virtual, and/or cloud technologies. The application instances of the application can run in a physical, virtual, or cloud environment, where one instance may run in a same or different environment than another instance.

The application instance running in the primary mode on the computing device (e.g., computing device 100) may fail over to the second application instance (e.g., a second application instance running on second computing device 100B) responsive to detecting failure of the first application instance. By replicating application data across the set of computing devices (e.g., computing devices 100, 100B, . . . , 100N), the application can failover to the second application instance (e.g., a second application instance running on second computing device 100B) without a large amount of downtime of the application. Applicant data redundancy to facilitate such a failover, however, is complex to manage.

In these examples, each application instance running on a computing device may manage its own role (e.g., primary or secondary). The application instance running in the primary mode on a computing device (e.g., computing device 100) may provide the full services of the application while a second application instance (e.g., a second application instance running on a second computing device 100B) may receive data and wait for an indication that it should begin a process to convert to running in the primary mode. In the process to change the first application instance from primary to secondary mode, and change the second application instance from secondary to primary mode, the respective computing devices (e.g., computing devices 100 and 100B) perform functionality to help ensure that data integrity is not compromised. The data stored at both computing devices (e.g., computing device 100 and 100B) may be validated via data integrity compliance checks to ensure that the respective application instances can be run in the respective new modes. A second application instance running on a second computing device may only be changed from a secondary mode to a primary mode responsive to validating that the second application instance and second computing device passed a data integrity compliance check.

In some examples, an application instance (and the computing device on which it runs) may store information about the application instance, including, for example, the mode of the application instance, a set of rules related to failover of the application instance, configuration information related to the application instance, information about other application instances and/or the cloud server 50, data obtained by and communicated by the application instance, status information for other application instances, mode information for other application instances, data currency level information for other application instances, and/or other data relevant to the application instance. The application instance may also periodically store real-time state information, including, for example, role of each application instance, mode transition time, replication stop time, replication resume time, application instance identifiers, current mode, and/or other information relevant to the application. In some examples, the cloud server 50 may also monitor to detect failure of the application instance.

An application instance running in primary mode on a computing device (e.g., computing device 100) may monitor for failure detection in various manners. For example, the application instance running in primary mode may detect failure in the communication mechanisms of the application instance. A failure of the communication mechanism may be detected, for example, by a failure of a physical link, logical link, circuit, and/or any other part of the network stack used to communicate data to and from the application instance. Redundant links exist for failover even if an existing link used by the application instance fails. A failure of the communication mechanisms of the application instance may also be detected by a queue maintained by the application for application writes growing at a rate past a predetermined threshold rate, messages getting buffered out, and/or having other issues. Issues with the write queue may indicate, for example, that a storage communicably coupled to the application and/or application instance is waiting to be updated for transactions getting processed by the application instance and is out of date. Other examples of failure monitored by the application instance include, but are not limited to, software defects, defective operating system instances, application crashes, server hardware issues or failure, application stack failures, storage issues, an inability to render storage to the application, a loss of connection between storage and the application, limited availability of data, failure of a data replication mechanism, and/or other types of failure. In some examples, the application instance may store information regarding which types of failures may constitute a failure that causes the application instance to change modes. In some examples, an application residing on cloud server 50 may communicate with the application instance running in primary mode on computing device 100 to monitor the application instance for failure through application programming interfaces and/or other mechanisms.

In some examples, the application and/or application instance may automatically provide a notification responsive to a failure of data replication being detected. In some of these examples, the application instance may determine that data replication failed responsive to replication not occurring for longer than a threshold time period. The threshold time period may be stored in a storage communicably coupled to the application instance and may be provided by a user, provided by an admin, determined via past performance of the application, refined via machine learning, determined based on quality of service requirements, may be application specific, may be instance specific, may be package specific, and/or may have other characteristics.

Responsive to determining that a failure has occurred, the application instance may determine that its mode needs to be changed. The application instance may check a set of rules associated with the application to determine how to handle the failure (e.g., to remediate the failure, to failover the application to another application instance, and/or take other action). The set of rules may comprise, for example, a set of conditions related to a permissible amount of data loss during a transition of modes of the application instance and the second application instance and a set of actions to be taken responsive to the set of conditions being met. For example, responsive to determining that the set of conditions related to data loss is not met based on the set of rules, the application instance may decide not to transition from the primary mode to the second mode and failover to the second application instance. In another example, responsive to the set of conditions from the set of rules being met, the application instance may decide a failover is necessary and may change from the primary mode to the secondary mode.

The rules may be stored in a storage communicably coupled to the application instance and may be provided by a user, provided by an admin, determined via past performance of the application, refined via machine learning, determined based on quality of service requirements, may be application specific, may be instance specific, may be package specific, may be based on the health of the computing device or environment on which the application instance runs, may be based on the health of the infrastructure facilitating the application or running of application instance, and/or may have other characteristics. In some examples, the rules may specify that the application instance may also obtain real-time information from the storage communicably coupled to the application instance to validate that the application instance has failed and the application needs to failover to a second application instance.

In some examples, the determination that a mode change needs to occur may happen automatically in response to a failure occurring. In other examples, a mode change may be initiated by an administrator of the application, in the course of running the application, as part of scheduled maintenance for the application and/or its environment, and/or in various other manners.

Based on the determination that the application instance should change modes from primary to second mode, a second application instance (e.g., running on a second computing device 100B) may be selected from a set of application instances each running in secondary mode. In some examples, the second application instance may be selected after determining that a failover to that second application instance may result in a lower or lowest set of application mode conversion metrics (e.g., recovery point objective, recover time objective, and/or other metrics). In some examples, each of the set of application instances can be ranked based on these metrics, and a second application instance can be selected based on the ranked set of metrics that indicate the most efficient mode change. Further, the second application instance may take steps to check that the second application instance has access to all of the data accessible to the application instance, to ensure that data integrity for the application is maintained. The application instance may also take steps to remediate from any failure that caused the change of modes, to return back to a primary mode.

Before changing the mode of the selected second application instance from secondary to primary, the application instance and/or the selected second application instance may each perform data integrity compliance checks. The data integrity compliance check for each application instance may comprise a validation that only one instance of the application is in a primary mode. To perform this validation, each application instance may communicate to ensure that only instance of the application is in a primary mode. For example, the application instance may send a notification to the selected second application instance responsive to the application instance changing modes. The second application instance may change its mode from secondary to primary responsive to receiving the notification.

In some examples, the data integrity compliance check for each application instance may also comprise other validations, based on the future mode of the application instance, the application being provided, stored preferences related to the application, and/or other factors. In some examples, each application instance may perform a data integrity compliance check by performing the same set of validations. For example, the application instance and/or the second application instance may validate that a potential loss of data between the application instance and the second application instance during the changing of modes does not exceed a predetermined threshold, a quality of service requirement (including, for example, a recovery point objective requirement, recovery time objective, and/or other requirement), and/or other relevant value. A recovery point object may comprise, for example, an interval of time for a disruption of service for an application between a quantity of data lost during that time period exceeds a maximum allowable threshold. A recovery time objective may comprise, for example, a duration of time and a service level to which an application must be restored after a failure to avoid an unacceptable amount of process disruption. Another validation may include ensuring that the resources on which second application instance runs (e.g., a second computing device 100B) has sufficient resources (e.g., processing capability, storage, and/or other resource requirements) to run the second application instance in primary mode. Another validation may be related to data currency levels, to ensure that the application instance and the selected second application instance have the same data related to a same set of transactions.

Some or all of these validations may be performed based on real-time information obtained from the application instance and/or second application instance. The validations may also be performed, in some examples, using internal communication links between the application instance and/or the second application instance (e.g., in an intranet environment). In some examples, the validations performed may be based on the application, the environment, the users of the application, preferences provided by the administrator of the application, the health of the computing device or environment on which the second application instance runs, the health of the infrastructure facilitating the application or running of the second application instance and/or other factors. The validations performed are not limited to the examples provided herein.

In examples in which the validation does not pass, the second application instance would not change modes from secondary to primary. In these examples, a third application instance from the set of application instances may be selected for a mode change, and may undergo a same set of validations. In some examples, the third application instance may be selected in a same manner as the second application instance. If none of the set of application instances have passed validation, a notification may be provided to users and/or an administrator of the application. In some examples, an administrator or user may have an ability to override a failed validation and force a mode change for a selected application instance. In other examples, none of the application instances may run in primary mode responsive to none of the set of application instances passing the validation checks. In these other examples, the application may not be available until remediation of the failure occurs.

In some examples, all of the application instances may have failure. In these examples, responsive to remediation of the failure of the application instances, one application instance may be selected to run in the primary mode and the remaining application instances may be run in secondary mode. In some examples, the selection of the application instance to run in the primary mode may be the same as or similar to the selection of the second application instance to run in primary mode, as described above. In other example, the application instance to run in primary mode may be selected based on which instance or environment included the application instance running in primary mode prior to the failure.

Responsive to the validation passing (and/or a mode change being forced), the mode of the selected application instance may be changed from secondary to primary. In some examples, this mode change may occur by the use of application programming interfaces or application specific commands received through an interface.

Figure 2:
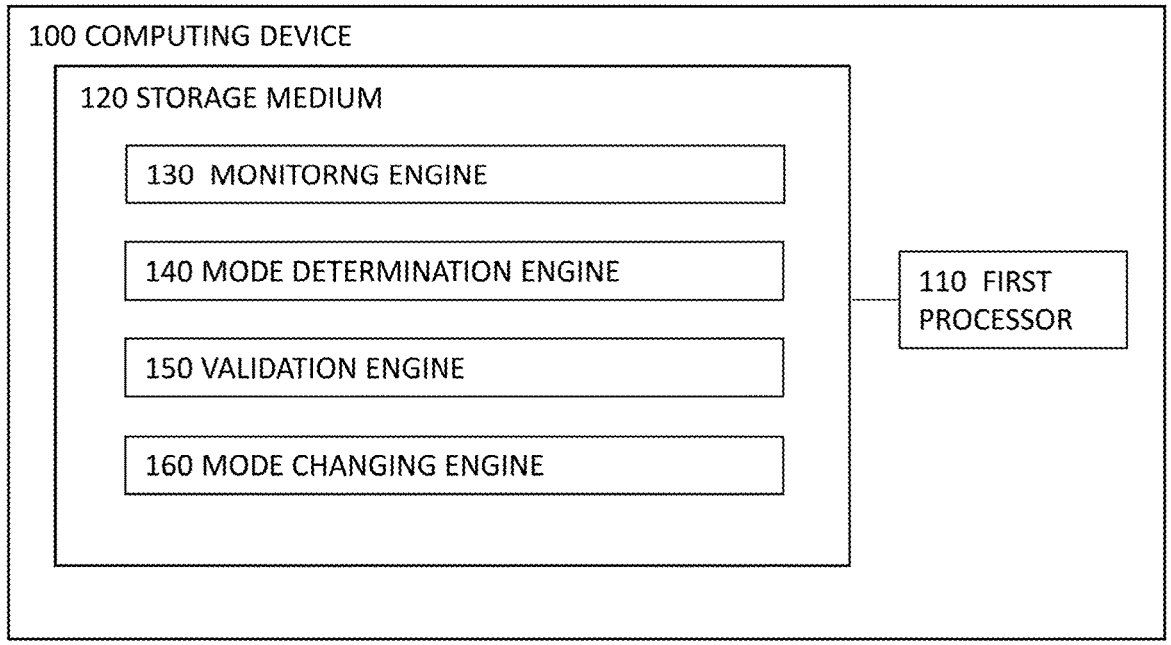
FIG. 2 is a block diagram depicting an example device for reducing recovery time of an application.

FIG. 2 is a block diagram depicting an example device for reducing recovery time of an application. In some examples, the example device 100 may comprise the device 100 of FIG. 1. Computing device 100, which facilitates reducing recovery time of an application, may comprise a physical processor 110, a monitoring engine 130, a mode determination engine 140, a validation engine 150, mode changing engine 160, and/or other engines. The term "engine", as used herein, refers to a combination of hardware and programming that performs a designated function. As is illustrated with respect to FIG. 2, the hardware of each engine, for example, may include one or both of a physical processor and a machine-readable storage medium, while the programming is instructions or code stored on the machine-readable storage medium and executable by the physical processor to perform the designated function.

Monitoring engine 130 may monitor, based on a first application instance of the application running in a first mode, for failure detection of the first application instance running on a first computing device (e.g., device 100). In some examples, the monitoring engine 130 may monitor for failure by monitoring for failure to replicate data based on a corresponding mode of the first application instance and a set of data replication requirements associated with the corresponding mode. The monitoring engine 130 may monitor for failure detection of the application instance in a manner similar or the same as described above with respect to FIG. 1.

The mode determination engine 140 may determine that the first application instance is to be changed from the first mode to a second mode. In some examples, the validation engine 150 may determine that the first application instance is to be changed from the first mode to the second mode in a manner similar or the same as described above with respect to FIG. 1.

The validation engine 150 may validate, based on the determination by the mode determination engine 140, that the second application instance can run in the first mode by performing a data integrity compliance check. In some examples, the validation engine 150 may validate that the second application instance can run in the first mode in a manner similar or the same as described above with respect to FIG. 1.

Mode changing engine 160 may, responsive to the validation by the validation engine 150, facilitate running of the second application instance in the first mode. The mode changing engine 160 may facilitate running of the second application instance in the first mode in a manner similar to or the same as described above with respect to FIG. 1.

In performing their respective functions, engines 130-160 may access storage medium 120 and/or other suitable database(s). Storage medium 120 may represent any memory accessible to the device 100 that can be used to store and retrieve data. Storage medium 120 and/or other databases communicably coupled to the edge device may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. The device 100 that facilitates reducing recovery time of an application may access storage medium 120 locally or remotely via a network.

Storage medium 120 may include a database to organize and store data. The database may reside in a single or multiple physical device(s) and in a single or multiple physical location(s). The database may store a plurality of types of data and/or files and associated data or file description, administrative information, or any other data.

Figure 3:
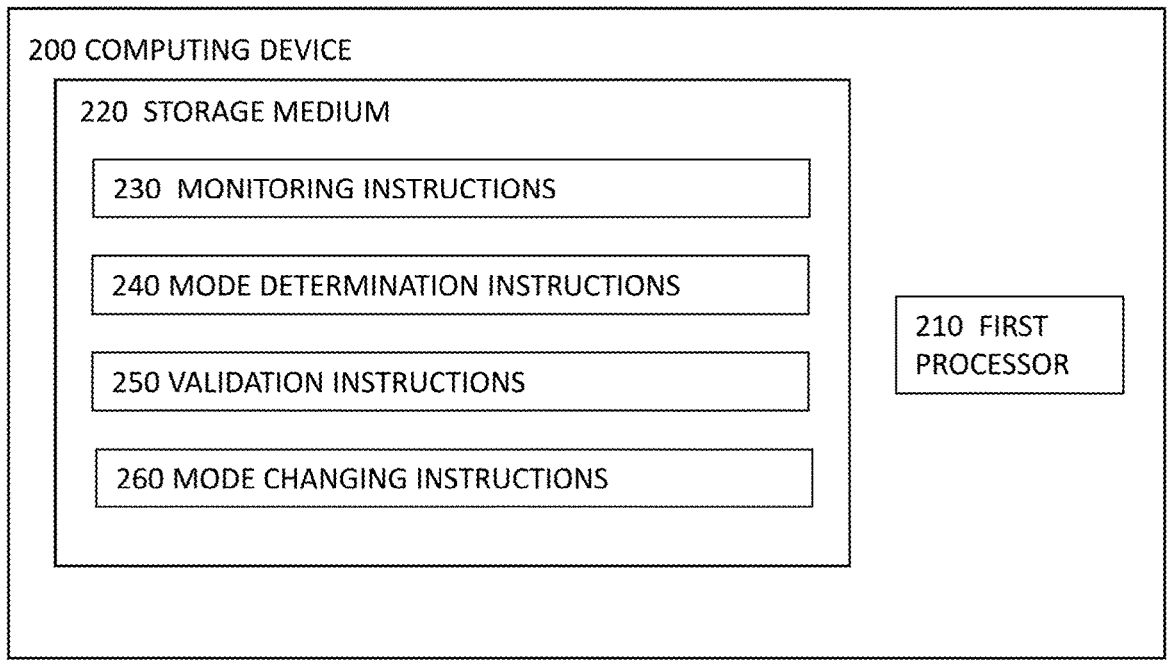
FIG. 3 is a block diagram depicting an example device for reducing recovery time of an application.

FIG. 3 is a block diagram depicting an example machine-readable storage medium 220 comprising instructions executable by a processor for reducing recovery time of an application.

In the foregoing discussion, engines 130-160 were described as combinations of hardware and programming. Engines 130-160 may be implemented in a number of fashions. Referring to FIG. 3, the programming may be processor executable instructions 230-260 stored on a machine-readable storage medium 220 and the hardware may include a physical processor 210 for executing those instructions. Thus, machine-readable storage medium 220 can be said to store program instructions or code that when executed by physical processor 210 implements a device that facilitates reducing recovery time of an application of FIG. 1.

In FIG. 3, the executable program instructions in machine-readable storage medium 220 are depicted as monitoring instructions 230, mode determination instructions 240, validation instructions 250, mode changing instructions 260, and/or other instructions. Instructions 230-260 represent program instructions that, when executed, cause processor 210 to implement engines 130-160, respectively.

Machine-readable storage medium 220 may be any electronic, magnetic, optical, or other physical storage device that contains or stores executable instructions. In some implementations, machine-readable storage medium 220 may be a non-transitory storage medium, where the term "non-transitory" does not encompass transitory propagating signals. Machine-readable storage medium 220 may be implemented in a single device or distributed across devices. Likewise, processor 210 may represent any number of physical processors capable of executing instructions stored by machine-readable storage medium 220. Processor 210 may be integrated in a single device or distributed across devices. Further, machine-readable storage medium 220 may be fully or partially integrated in the same device as processor 210, or it may be separate but accessible to that device and processor 210.

In one example, the program instructions may be part of an installation package that when installed can be executed by processor 210 to implement a device that facilitates reducing recovery time of an application. In this case, machine-readable storage medium 220 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 220 may include a hard disk, optical disk, tapes, solid state drives, RAM, ROM, EEPROM, or the like.

Processor 210 may be at least one central processing unit (CPU), microprocessor, and/or other hardware device suitable for retrieval and execution of instructions stored in machine-readable storage medium 220. Processor 210 may fetch, decode, and execute program instructions 230-260, and/or other instructions. As an alternative or in addition to retrieving and executing instructions, processor 210 may include at least one electronic circuit comprising a number of electronic components for performing the functionality of at least one of instructions 230-260, and/or other instructions.

FIG. 4 is a flow diagram depicting an example method for reducing recovery time of an application. The various processing blocks and/or data flows depicted in FIG. 4 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the method of FIG. 4 as illustrated (and described in greater detail below) is meant be an example and, as such, should not be viewed as limiting. The method of FIG. 4 may be implemented in the form of executable instructions stored on a machine-readable storage medium, such as storage medium 220, and/or in the form of electronic circuitry.

In an operation 300, based on a first application instance of the application running in a first mode, monitoring may occur for failure detection of the first application instance running on a first computing device. For example, the device 100 (and/or the monitoring engine 130, the monitoring instructions 230, or other resource of the device 100) may monitor for failure detection of the first application instance. The device 100 may monitor for failure detection of the first application instance in a manner similar or the same as that described above in relation to the execution of the monitoring engine 130, the monitoring instructions 230, and/or other resource of the device 100.

In an operation 310, a determination may be made that the first application instance is to be changed from the first mode to the second mode. For example, the device 100 (and/or the mode determination engine 140, the mode determination instructions 240 or other resource of the device 100) may determine the first application instance is to be changed from the first mode to the second. The device 100 may determine the first application instance is to be changed from the first mode to the second in a manner similar or the same as that described above in relation to the execution of the mode determination engine 140, the mode determination instructions 240, and/or other resource of the device 100.

Figure 4A:
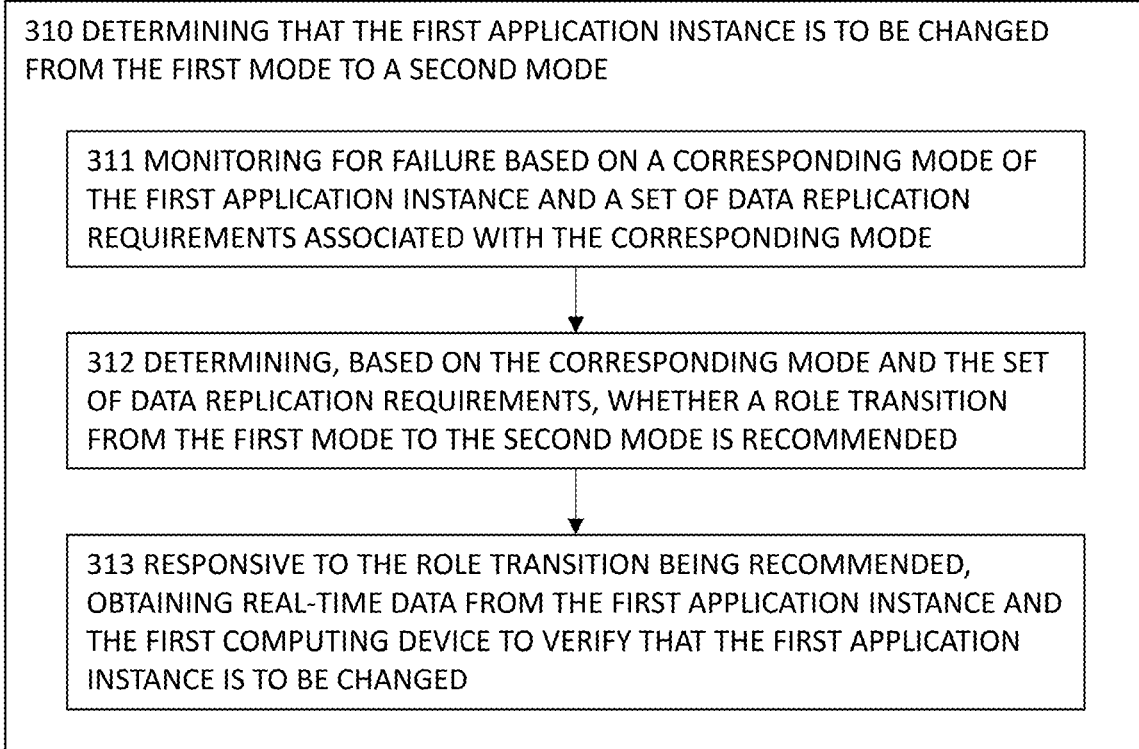
FIG. 4A is a block diagram depicting an example device for reducing recovery time of an application.

In some examples, operation 310 may occur in various manners. In some examples, and as depicted in FIG. 4A, operation 310 may occur by performing operations 311-313.

In an operation 311, the first application instance may be monitored for failure to replicate data based on a corresponding mode of the first application instance and a set of data replication requirements associated with the corresponding mode. For example, the device 100 (and/or the mode determination engine 140, the mode determination instructions 240 or other resource of the device 100) may monitor for failure to replicate data based on the corresponding mode and the set of data replication requirements. The device 100 may monitor for failure to replicate data based on the corresponding mode and the set of data replication requirements in a manner similar or the same as that described above in relation to the execution of the mode determination engine 140, the mode determination instructions 240, and/or other resource of the device 100.

In an operation 312, a determination may be made, based on the corresponding mode and the set of data replication requirements, whether a role transition from the first mode to the second mode is recommended. For example, the device 100 (and/or the mode determination engine 140, the mode determination instructions 240 or other resource of the device 100) may determine the first application instance is to be changed from the first mode to the second. The device 100 may determine the first application instance is to be changed from the first mode to the second in a manner similar or the same as that described above in relation to the execution of the mode determination engine 140, the mode determination instructions 240, and/or other resource of the device 100.

In an operation 313, responsive to the role transition being recommended from operation 311, real-time data may be obtained from the first application instance and the first computing device to verify that the first application instance is to be changed. For example, the device 100 (and/or the mode determination engine 140, the mode determination instructions 240 or other resource of the device 100) may obtain real-time data from the first application instance and the first computing device to verify that the first application instance is to be changed. The device 100 may obtain real-time data from the first application instance and the first computing device to verify that the first application instance is to be changed in a manner similar or the same as that described above in relation to the execution of the mode determination engine 140, the mode determination instructions 240, and/or other resource of the device 100.

Returning to FIG. 4, in an operation 320, based on the determination of operation 310, a validation may be made that a second application instance can run in the first mode by performing a data integrity compliance check. For example, the device 100 (and/or the validation engine 150, the validation instructions 250 or other resource of the device 100) may validate that the second application instance can run in the first mode. The device 100 may validate that the second application instance can run in the first mode in a manner similar or the same as that described above in relation to the execution of the validation engine 150, the validation instructions 250, and/or other resource of the device 100.

In an operation 330, the second application instance may be facilitated to run in the first mode, responsive to validating that the second application instance can run in the first mode. For example, the device 100 (and/or the mode changing engine 160, the mode changing instructions 260, or other resource of the device 100) may facilitate running the second application instance in the first mode. The device 100 may facilitate running the second application instance in the first mode in a manner similar or the same as that described above in relation to the execution of the mode changing engine 160, the mode changing instructions 260, and/or other resource of the device 100.

FIG. 5 is a flow diagram depicting an example method for reducing recovery time of an application.

Operation 400 of FIG. 5 may be performed in a manner the same as or similar to operation 300 of FIG. 4, and as described above in relation to FIGS. 1-3.

In an operation 410, a validation may be performed to validate that failure of the first application instance occurred. For example, the device 100 (and/or the monitoring engine 130, the monitoring instructions 230, or other resource of the device 100) may validate the failure of the application instance. The device 100 may validate the failure of the application instance in a manner similar or the same as that described above in relation to the execution of the monitoring engine 130, the monitoring instructions 230, and/or other resource of the device 100.

In an operation 420, responsive to validating that the failure of the first application instance occurred, a determination may be made that the first application instance is to be changed from the first mode to a second mode. For example, the device 100 (and/or the mode determination engine 140, the mode determination instructions 240 or other resource of the device 100) may determine the first application instance is to be changed from the first mode to the second. The device 100 may determine the first application instance is to be changed from the first mode to the second in a manner similar or the same as that described above in relation to the execution of the mode determination engine 140, the mode determination instructions 240, and/or other resource of the device 100.

In an operation 430, a determination may be made, from a set of application instances of an application, that a second application instance is to be changed from running in the second mode to the first mode responsive to determining that the first application instance is to be changed from the first mode to the second mode. For example, the device 100 (and/or the mode changing engine 160, the mode changing instructions 260, or other resource of the device 100) may determine that the second application instance is to be changed from running in the second mode to the first mode. The device 100 may determine that the second application instance is to be changed from running in the second mode to the first mode in a manner similar or the same as that described above in relation to the execution of the mode changing engine 160, the mode changing instructions 260, and/or other resource of the device 100.

Operations 440 and 450 may be performed in a manner the same as or similar to operations 320 and 330, respectively, of FIG. 4, and as described above in relation to FIGS. 1-3

The foregoing disclosure describes a number of example implementations for reducing recovery time of an application. The disclosed examples may include systems, devices, computer-readable storage media, and methods for reducing recovery time of an application. For purposes of explanation, certain examples are described with reference to the components illustrated in FIGS. 1-5. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIG. 4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order.

Thus, the present disclosure merely sets forth possible examples of implementations, and many variations and modifications may be made to the described examples. All such modifications and variations are intended to be included within the scope of this disclosure and protected by the following claims.

The invention claimed is:

1. A method of reducing recovery time for an application, the method comprising:
monitoring, based on a first application instance of the application running in a first mode, for failure detection of the first application instance running on a first computing device, wherein monitoring for failure detection comprises:
monitoring for failure to replicate data based on a corresponding mode of the first application instance and a set of data replication requirements associated with the corresponding mode, and
monitoring a queue for the application to detect whether a number of application writes in the queue is growing at a rate that exceeds a predetermined threshold rate;
determining that the first application instance is to be changed from the first mode to a second mode;
based on the determination, validating that a second application instance can run in the first mode by performing a data integrity compliance check; and
responsive to validating that the second application instance can run in the first mode, facilitating running of the second application instance in the first mode.

2. The method of claim 1, wherein determining that the first application instance is to be changed from the first mode to the second mode comprises:
determining, based on the corresponding mode and the set of data replication requirements, whether a role transition from the first mode to the second mode is recommended; and
responsive to the role transition being recommended, obtaining real-time data from the first application instance and the first computing device to verify that the first application instance is to be changed.

3. The method of claim 1, further comprising:
responsive to determining that the first application instance is to be changed from the first mode to the second mode, determining, from a set of application instances of the application, that the second application instance is to be changed from running in the second mode to the first mode.

4. The method of claim 3, wherein the first mode is a primary mode, the second mode is a backup mode, and the set of application instances are run on a set of communicably coupled distributed computing devices across a network.

5. The method of claim 3, further comprising:
validating that only a single application instance of the application is running in the first mode.

6. The method of claim 3, further comprising:
selecting the second application instance from the set of application instances based on a set of application mode conversion metrics.

7. The method of claim 3, wherein each respective application instance of the set of application instances and corresponding computing device in which the respective application instance is run stores status information and currency level information for each other application instance in the set of application instances.

8. The method of claim 1, wherein performing the data integrity compliance check comprises determining that a potential loss of data between the first application instance and the second application instance during a changing of a mode of the first application instance from the first mode to the second mode and a changing of a mode of the second application instance from the second mode to the first mode does not exceed a predetermined threshold.

9. The method of claim 1, wherein performing the data integrity compliance check comprises determining that a time interval of a service disruption due to a changing of a mode of the first application instance from the first mode to the second mode and a changing of a mode of the second application instance from the second mode to the first mode is less than a maximum allowable threshold.

10. A non-transitory machine-readable storage medium comprising instructions that upon execution cause a computing device to:
monitor, based on a first application instance of an application running in a first mode, for failure detection of the first application instance running on the computing device, wherein the instructions to monitor for the failure detection comprise:
instructions to monitor a queue for the application to detect whether a number of application writes in the queue is growing at a rate that exceeds a predetermined threshold rate;
determine, based on the failure detection, that the first application instance is to be changed from the first mode to a second mode;
determine, from a set of application instances of the application, that a second application instance is to be changed from running in the second mode to the first mode responsive to determining that the first application instance is to be changed from the first mode to the second mode;
validate, based on determining that the second application instance is to be changed from the second mode to the first mode, that the second application instance can run in the first mode by performing a data integrity compliance check; and
cause running of the second application instance in the first mode responsive to validating that the second application instance can run in the first mode.

11. The non-transitory machine-readable storage medium of claim 10, wherein performing the data integrity compliance check comprises determining that a potential loss of data between the first application instance and the second application instance during a changing of a mode of the first application instance from the first mode to the second mode and a changing of a mode of the second application instance from the second mode to the first mode does not exceed a predetermined threshold.

12. The non-transitory machine-readable storage medium of claim 10, wherein the first mode is a primary mode, the second mode is a backup mode, and the set of application instances are run on a set of communicably coupled distributed computing devices across a network.

13. The non-transitory machine-readable storage medium of claim 12, wherein the instructions upon execution cause the computing device to further:

validate that only a single application instance of the application is running in the first mode.

14. The non-transitory machine-readable storage medium of claim 13, wherein the instructions upon execution cause the computing device to select the second application instance from the set of application instances based on a set of application mode conversion metrics.

15. The non-transitory machine-readable storage medium of claim 10, wherein performing the data integrity compliance check comprises determining that a time interval of a service disruption due to a changing of a mode of the first application instance from the first mode to the second mode and a changing of a mode of the second application instance from the second mode to the first mode is less than a maximum allowable threshold.

16. A system comprising:
a physical processor;
a non-transitory storage medium storing machine readable instructions executable on the physical processor to:
monitor for failure detection of a first application instance of an application running in a first mode on a first computing device, wherein the monitoring for the failure detection comprises monitoring a queue for the application to detect whether a number of application writes in the queue is growing at a rate that exceeds a predetermined threshold rate;
determine, based on the monitoring, that failure of the first application instance occurred;
responsive to determining that the failure of the first application instance occurred, determine that the first application instance is to be changed from the first mode to a second mode;
determine, from a set of application instances of the application, that a second application instance is to be changed from running in the second mode to the first mode responsive to determining that the first application instance is to be changed from the first mode to the second mode;
validate, based on determining that the second application instance is to be changed from the second mode to the first mode, that the second application instance can run in the first mode by performing a data integrity compliance check; and
cause running of the second application instance in the first mode responsive to validating that the second application instance can run in the first mode.

17. The system of claim 16, wherein performing the data integrity compliance check comprises determining that a potential loss of data between the first application instance and the second application instance during a changing of a mode of the first application instance from the first mode to the second mode and a changing of a mode of the second application instance from the second mode to the first mode does not exceed a predetermined threshold.

18. The system of claim 16, wherein the first mode is a primary mode, the second mode is a backup mode, and the set of application instances are run on a set of communicably coupled distributed computing devices across a network.

19. The system of claim 18, wherein the machine readable instructions are executable on the physical processor to:
validate that only a single application instance of the application is running in the first mode.

20. The system of claim 16, wherein performing the data integrity compliance check comprises determining that a time interval of a service disruption due to a changing of a mode of the first application instance from the first mode to the second mode and a changing of a mode of the second application instance from the second mode to the first mode is less than a maximum allowable threshold.

* * * * *